(No Model.) 6 Sheets—Sheet 5.

H. E. PRIDMORE.
GRAIN BINDER.

No. 437,719. Patented Oct. 7, 1890.

Fig. 5.

Witnesses
Wm A. Skinkle.
Chas. E. Gorton.

Inventor
Henry E. Pridmore
By his Attorneys
Parkinson & Parkinson (No Model.) 6 Sheets—Sheet 6.

H. E. PRIDMORE.
GRAIN BINDER.

No. 437,719. Patented Oct. 7, 1890.

Witnesses
Wm A. Skinkle.
Chas. E. Gorton.

Inventor
Henry E. Pridmore
By his Attorneys
Parkinson & Parkinson

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

GRAIN-BINDER.

SPECIFICATION forming part of Letters Patent No. 437,719, dated October 7, 1890.

Application filed April 5, 1889. Serial No. 306,088. (No model.)

*To all whom it may concern:*

Be it known that I, HENRY E. PRIDMORE, a citizen of the United States of America, residing at Chicago, in the county of Cook and State of Illinois, have invented certain new and useful Improvements in Grain-Binders, of which the following is a specification.

This invention to a certain extent is an extension or carrying out of that described in an application for Letters Patent for improvement in harvesters filed by me in the United States Patent Office on the 5th day of October, 1889, Serial No. 326,124—that is to say, in said application the frame-work was so modified as to dispense with much of that heretofore generally carried outside of the main wheel in elevator-machines for the purpose of bringing the binding attachment nearer into the main wheel. Such reorganization in the harvester has led to the reorganization of the binder-frame to adapt it to employment therewith, and occasion will arise hereinafter to refer to said application, in connection with which the present drawings may be read.

Another feature of the invention relates to the metal table-trip, which is now a distinctive feature of the McCormick machines; and it consists in providing said trip with a depending finger, which takes between ears upon the supporting-block for the outside trip-finger, thereby preventing lateral movement in said trip.

In a patent granted the McCormick Harvesting Machine Company, assignee, on the 6th day of April, 1886, No. 339,515, is described a compressing and tripping device wherein the compressor-shaft is carried along outside of the subtending arm and outer tubular frame-bar of the binder, while a rocking trip-shaft runs along the inner side of said bars and is operated from the trip-fingers much in the same manner as in the primary Appleby type. I now dispense with this independent trip-shaft and cause the compressor-shaft to serve instead thereof, to this end locating a trip-latch of peculiar construction outside of the binder-frame post and arranging its heel end to be acted upon by the depression of the crank which connects the compressor-shaft with the spring-link. Finally a backlash-dog is arranged to act directly upon a stop from the hub of the driving-pinion, which is shown as a sprocket-pinion and holds it in opposition to the action of the trip-latch upon the driving-dog, and is released by a cam or tappet upon the hub of the trip-latch, which strikes its heel-extension whenever the trip-latch is disengaged and lifted from the driving-dog.

A represents the post-frame or main bracket, having one tubular arm or sleeve $a$ overhanging the binder-table or decking and serving as a bearing or support for the tyer-shaft, and a second tubular arm or sleeve $a'$ subtending said table and receiving the rock-shaft which carries the binder-arm. This subtending sleeve has also on the outside ears or lugs $a^2$, provided with bearings for the reception of a rock-shaft, which carries the outside compressing-finger.

Figure 1:
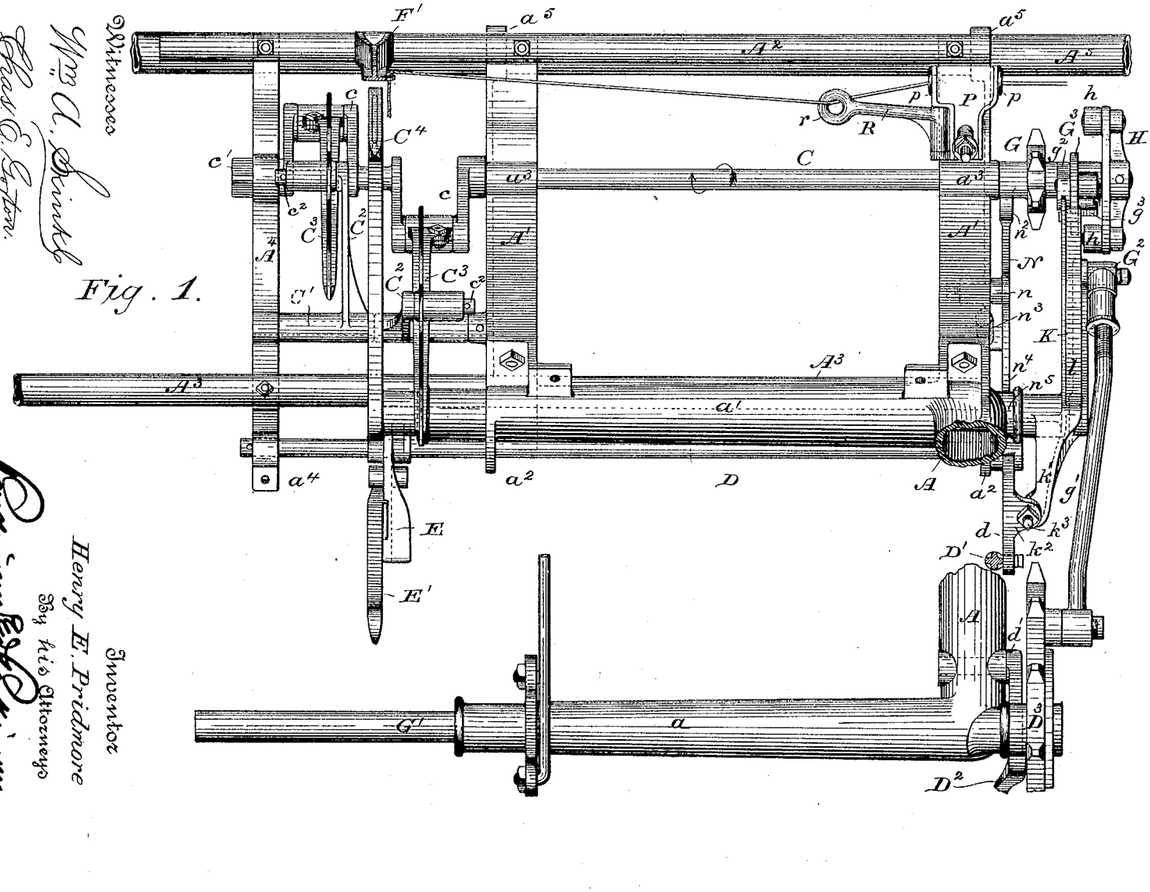
Figure 1 is a top plan view of so much of a grain-binding attachment embodying my invention as is necessary to an understanding thereof.
Figure 2:
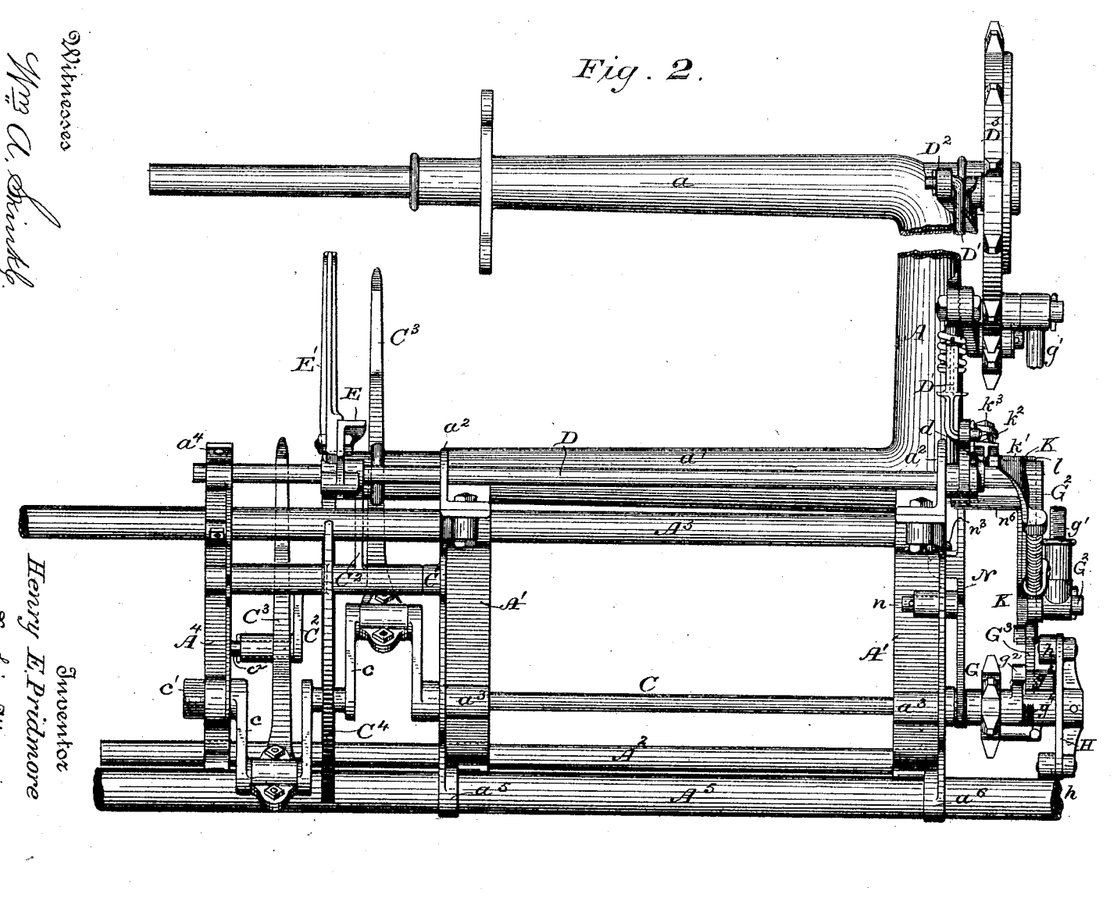
Fig. 2 is an elevation from the inner side thereof.
Figure 3:
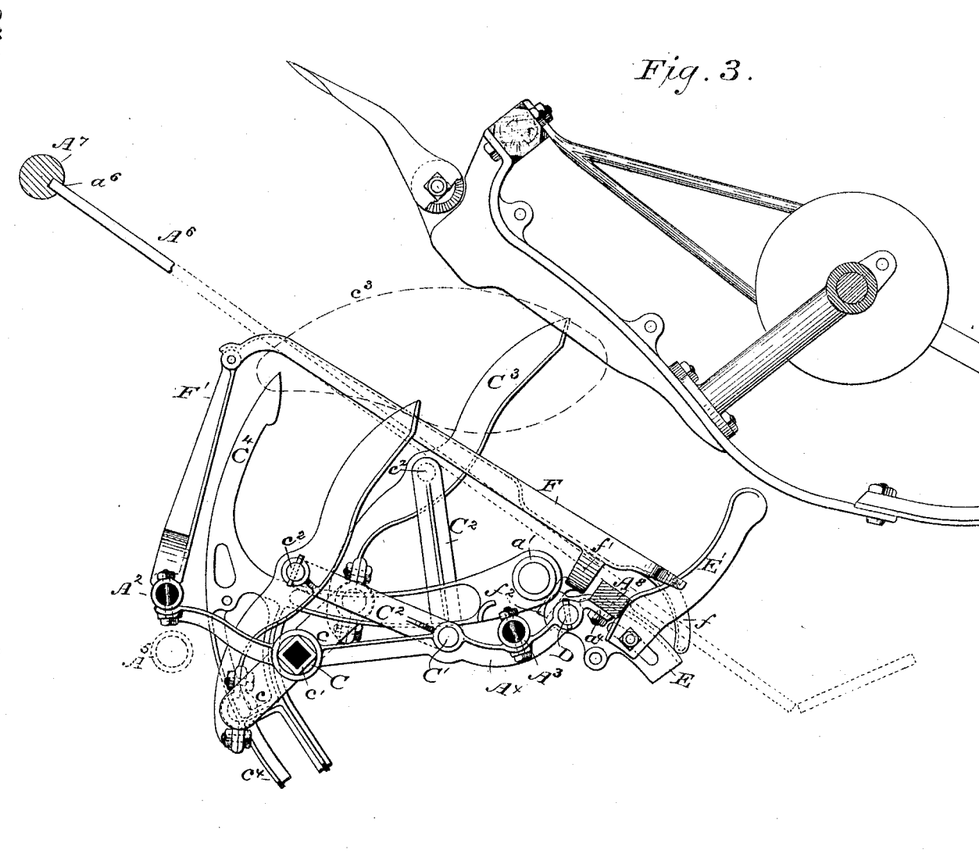
Fig. 3 is a rear elevation.
Figure 4:
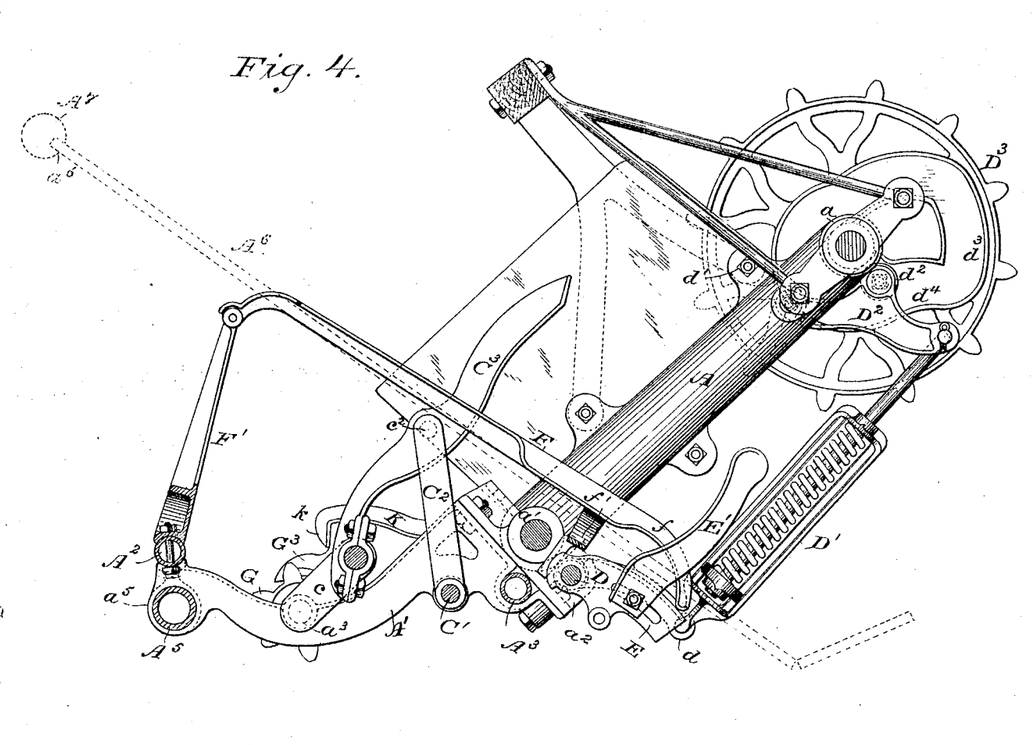
Fig. 4, a vertical transverse section looking from the rear and taken on the line of the cord-slot.

Bolted to ledges from the foot and lower tubular or subtending arm of the post-frame are two transverse metal bars A', having each on the inner side of and at some distance from the subtending arm a bearing $a^3$ for the packer-shaft, or that shaft continuously driven from the harvester. Heretofore the general trend of these transverse frame-bars has been parallel with the grain chute or decking; but, owing to the reorganization incident to the construction of the harvester heretofore mentioned, it is now downward and divergent from said chute as they depart from the post-frame, which occupies its usual position and relation to the decking. At their extreme inner ends the transverse bars are bolted to a tubular frame-bar $A^2$, which, however, instead of being saddled by them, as in former constructions, is seated upon them and near their outer ends beneath the binder-arm shaft or lower tubular arm of the post-frame. They are likewise secured to a second tubular frame-bar $A^3$, extending parallel with the first from front to rear of the binder. This second tubular bar is, like the first, now more conveniently placed above the transverse bars, and in fact resting in sockets beneath and parallel with the subtending arm of the post-frame, as shown in Fig. 4, and confined therein by the ledges from the foot and subtending arm of the post-frame, bolted to the transverse frame-bars, as above stated, since the divergence of said transverse bars from the decking allows the needle to withdraw its point through the cord-slot before it comes in contact with said bar, which under this arrangement may serve as a rest for the shank of the needle, as indicated in the third figure of the drawings. In rear of the post-frame the longitudinal bars are united by other transverse metal frame-bars $A^4$, having the general outline of those bolted to the subtending arm of the post-frame, and steps $a^4$ are formed at the outer end of these rear transverse bars to receive the front end of a longitudinal wooden bar $A^8$, which serves as a means for securing the lower part of the wooden decking.

Two of the transverse bars, herein shown as the forward two, or those bolted to the post-frame, are cast at their inner ends with sleeves $a^5$, which take over a slide upon the tubular guiding and supporting bar $A^5$, permanently secured, as intimated in the preamble, to the harvester close alongside the main wheel, so that the binder-frame may be adjusted back and forth on said bar and supported at the inner side entirely thereby, while the outer side will or may be supported in the usual manner upon anti-friction rolls at the tops of standards from the outside girt of the harvester, which, with this construction, is intended to be the girt that supports the segment-rack standards at the outside of the main wheel. In such adjustments the upper edge of the decking $A^6$ will be supported and guided on a longitudinal groove $a^6$ in the round wooden shaft $A^7$, permanently secured at the head of the elevator of the harvester just beneath the delivery-point of the aprons.

C is the constantly-driven packer-shaft having cranks $c$, and at the rear end having a square sleeve $c'$ for the telescoping connection with the shaft from the harvester. Between the two central transverse metal frame-bars of the binder and parallel with said packer-shaft and outside thereof is mounted a short axle $C'$, upon which are sleeved packer-links $C^2$, extending thence to bearings $c^2$ about midway of the length of the packers $C^3$—that is, about midway between their points and their tail ends, which latter are journaled upon the cranks of the packer-shaft, instead of such packers being journaled about midway of their length upon the cranks and receiving the links at their tail ends, as customary. This arrangement gives to the packers an orbital movement, such as indicated by dotted lines in Fig. 3, and causes them in their ascent to sweep in slightly beyond the point of the binder arm or needle $C^4$ and beyond its curved periphery or concentric guard $c^4$, as indicated in said figure, thus accomplishing the same purpose as the flukes set out from the back of the packers in the well-known Appleby machine.

The compressor-shaft D, as already stated, is mounted in bearings outside of the subtending arm of the post-frame and runs parallel therewith to the front of the machine, where it has a crank $d$, connected by spring-link $D'$ with the lever $D^2$, pivoted at $d'$ to the frame-post and having between said pivot and its free end an anti-friction roll $d^2$, which travels in the camway $d^3$, formed on the inner face of the gear and cam wheel $D^3$, herein shown as a sprocket-wheel, which camway is widened or cut away, as at $d^4$, opposite the point where the roll rests when the binder is out of action, and by the revolution of this wheel and the action of the cam-groove the compressor-shaft is rocked inward at the proper moment and in the usual manner.

At the rear end of the compressor-shaft, or that end opposite the needle, is pinned the curved block E, adjustably supporting the tripping and compressing finger $E'$, which as it is pushed outward by the accumulating-gavel thereby rocks the shaft outwardly and sets the trip device in motion. This outward rocking movement, however, does not compress the spring-link, but an independent spring, as will be presently explained, the widened or cut-away portion of the cam-groove permitting the link to fall or sink as said latter spring is compressed.

The metal table-trip F is pivoted at the inner end to a standard $F'$, rising from the tubular frame-bar at the inner side of the binder-frame to a sufficient height to bring the heel of said trip in its proper relation to the decking. At its outer end it has a finger $f$ resting, as usual, on the outer surface of the compressor or trip-finger supporting block, so as to depress said block and rock the compressor-shaft when borne down by the accumulation of the gavel, and thereby either trip independently or assist the trip-finger in tripping. The two arms are held together near their outer end by an inverted bridge $f'$, and in order to prevent lateral movement or bending, which might tend to throw the table-trip out of action, a finger $f^2$ depends from the center of said bridge between segmental ears $f^3$, formed upon the hub of the compressor-block, the segments being of sufficient length to insure that the finger shall always be retained between them in every movement of the compressor-shaft, whether the compressor is raised to meet the incoming grain or thrown beneath the table to allow the discharge of the bound sheaf.

At the front end of the packer-shaft is a small sprocket wheel or pinion G, running loosely on the shaft, which may, however, represent the usual spur-gear employed at this point. This sprocket-pinion is connected by a chain $g$ with the gear and cam sprocket at the top of the post-frame, so that when set in action it will drive said gear and cam sprocket and through it the tyer-shaft $G'$, upon which it is mounted, and also by the pitman-connection $g'$ and the crank $G^2$ from the needle-shaft will operate the needle or binder arm itself at the proper time. The pinion has a sleeve encircling the packer-shaft and extending forward some distance, and from the sleeve rises an ear $g^2$, to which is pivoted the driving-dog $G^3$, having a lug $g^3$ on the side farthest from the pinion and normally pressed forward by a coiled spring $g^4$, seated against the lug $g^5$, and at its expanding end bearing against the heel of the dog, so that when the latter is free it may be swung forward on its pivot until a shoulder $g^6$ strikes the sleeve and prevents its further movement.

At the extreme end of the packer-shaft, alongside the dog, is a cross-head H, having at each extremity an anti-friction roll $h$, opposed to the lug from the dog and revolving in the path of said lug whenever the dog has been carried to the extreme of its spring-urged movement, but passing outside of the lug when the latter is held back against the force of the spring, so that when the dog is free one or the other of the rolls on the cross-head will engage the lug on the dog and drive the pinion.

Figures 6, 8, 9:
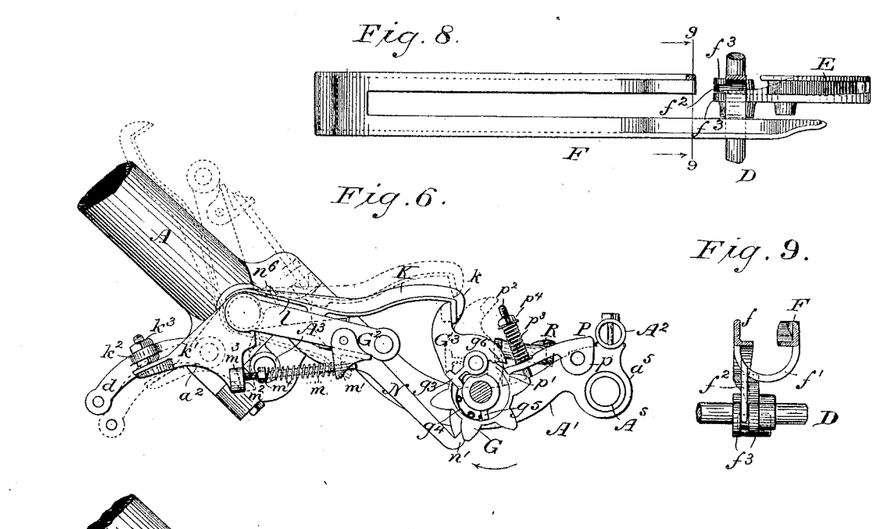
Fig. 6, a detail of the trip-clutch and accessory mechanism, showing also the backlash-dog.
Fig. 8 is a top plan view of the table-trip and outside tripping and compressing finger and compressor-shaft, one arm of the table-trip being broken away to expose the ears upon the finger-support and the depending lug from the table-trip taking between said ears.
Fig. 9 is a transverse section upon the correspondingly-numbered line in the preceding figure and taken for the same purpose.
Figure 7:
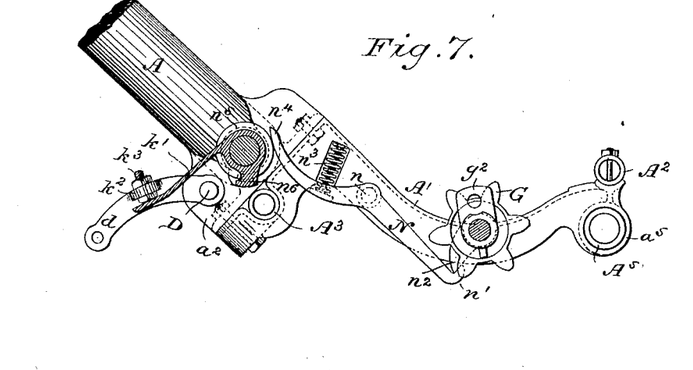
Fig. 7, a detail of part of the trip-clutch, showing the backlash-dog and the tappet for releasing it.
Figure 10:
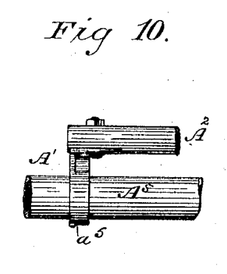
Fig. 10 is a detail to explain the manner of mounting the binding-frame upon the harvester.

Mounted upon the needle-shaft or other suitable pivot is the trip-latch K, having a hooked end $k$ to catch the dog on the inner side and hold it back against the action of the spring. The heel $k'$ of the trip-latch is extended until it comes alongside the crank at the front end of the compressor-shaft and beneath an ear $k^2$ therefrom, in which ear is set an adjusting-screw $k^3$, so that whenever this crank is depressed by the yielding of the compressing-finger or by the action of the table-trip, or both, the corresponding end of the trip-latch will be depressed and its effective end will be raised from engagement with the driving-dog, which will thereupon fly into action and cause the driving-pinion to be started. The trip-latch is formed with a ledge or offset $l$, which lies over and parallel with and in close proximity to the upper edge of the crank from the needle-shaft, so that whenever the needle is started this crank will strike the ledge and carry the trip-latch up and hold it out of action, as indicated in dotted lines in the sixth figure of the drawings, until the binding action is complete, when the latch will be brought into position to engage with the driving-dog once more.

In order to furnish the elastically-yielding resistance to the compressor-shaft in its initial tripping movement, a pin or rod $m$ is passed through a lug $m'$ near the end of the needle-shaft crank and seated in a socket $m^2$ upon a lug $m^3$ from the heel of the trip-latch, a coiled spring $m^4$ set about this rod, and a nut $m^5$ applied thereto to adjust the stress of the spring, so that the spring will always urge the heel of the latch away from the needle-crank, lifting it, when the binder is at rest, against the ear from the crank on the compressor-shaft, and thereby urge the compressor-finger forward toward the incoming gavel. When the compressor yields, it will first cramp this spring until the needle-crank is lifted sufficiently to disengage the trip-latch, and will then be stopped and controlled by the spring-link, which first exerts its force after the tripping has been accomplished.

I prefer to apply the backlash-dog to the driving-pinion itself, and for this purpose said dog N is pivoted at $n$ upon the front frame-bar $A'$, and at its point has an upstanding hook $n$, opposed to the downsetting hook of the trip-latch to engage with a lug $n^2$ from the hub of the trip-pinion. Beyond the pivot the heel of the backlash-dog is pressed down by a spring $n^3$, set in a suitable socket in the front transverse frame-bar, and at its extreme end or tang $n^4$ it rests upon a sleeve $n^5$ from the post-frame, encircling the outer end of the needle-shaft, and whenever the trip-latch is raised by the starting of the machine it is struck by a cam-arm $n^6$, overlapping said sleeve from the hub of the latch and lifted against the force of the spring, thus carrying down the effective hooked end out of the way of the lug with which it engages and being retained out of such way until the needle again falls beneath the table and the binder is about to come to rest, when in the descent of the trip-latch the cam will be carried out from beneath the tail of the dog and the latter will be forced by its spring into the path of its lug ready to snap over it when it comes around.

P is the tension-plate saddling the front frame-bar at its inner end, where it is provided with depending eye-lugs $p$ on each side thereof, through which the cord is drawn. Heretofore this tension-plate has been pivoted to the frame-bar at its outer or stubble end; but this I dispense with by bending down said end into a flange or foot $p'$, which rests upon the top of the bar, and between this flange and the saddling part arranging an upstanding pin $p^2$ from said bar, which passes through a hole in the tension-plate and receives a coiled spring $p^3$ and an adjusting-nut $p^4$, whereby the pressure of this spring is determined.

To the rear side of the frame-bar adjacent to the tension-plate is pivoted a short arm or lever R, having at its extreme end an eye $r$, through which the cord is drawn after it leaves the tension on its way to the needle, and by the weight of which any little slack that may exist between the tension and needle will be taken up.

Figure 5:
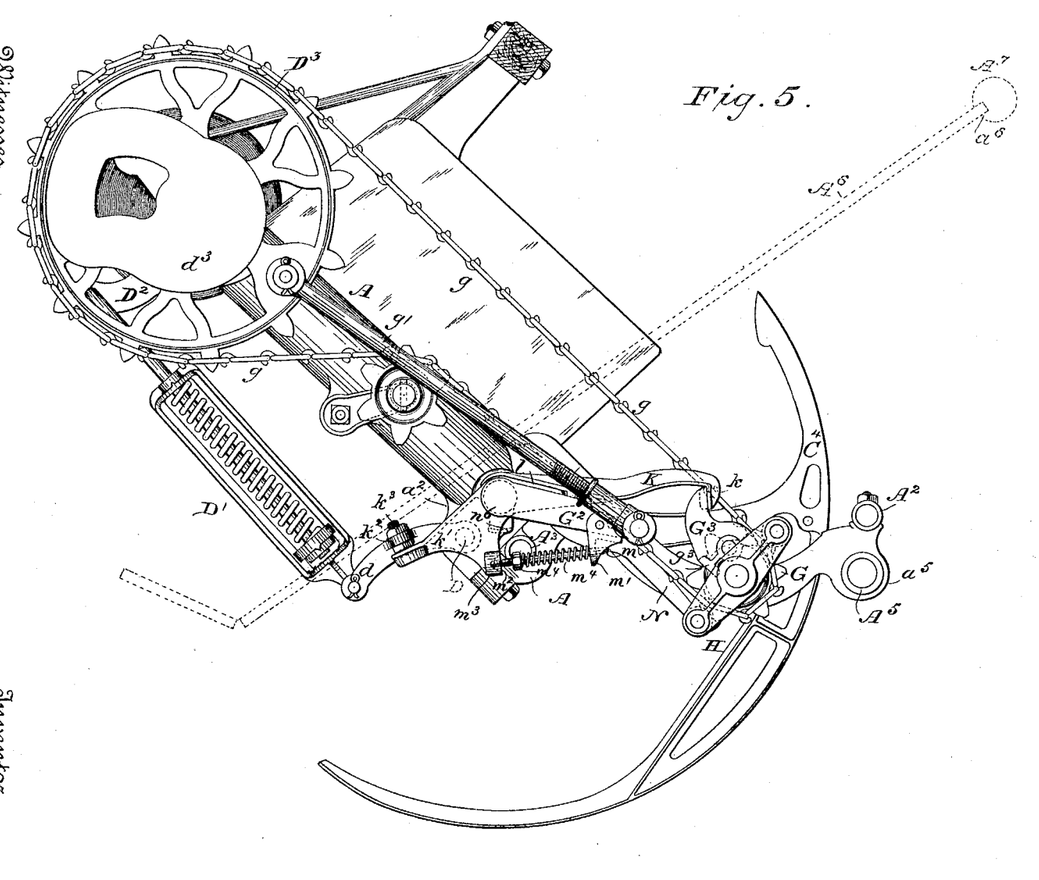
Fig. 5, a front elevation.

In operation, the parts being in the position shown in Figs. 4 and 5, with the driving-dog out of action, the binder arm or needle beneath the table, the tripping and compressing finger in position to oppose the incoming grain, and the spring-link between the compressor-shaft and the gear and cam wheel sustained by the expansive force of the spring between the needle-shaft crank and the heel of the trip-latch at the highest point permitted by the cam groove or track, with its roller at the top of the widening in said groove, grain is packed into the binding-receptacle and against the tripping and compressing finger until the latter yields and rocks the compressor-shaft sufficiently to bear down the heel of the trip-latch, compressing the spring between said heel and the needle-shaft crank and permitting the compressor-link to fall through the space determined by said widening in the cam-groove without itself being compressed. This rocking movement of the compressor-shaft will finally disengage the trip-latch by the compression alone of the spring between the latch and the needle-shaft crank, when the whole binder will be thrown into action, the needle will rise, lifting the trip-latch with it, the backlash-dog will be struck and moved out of the path of its engaging lug by the cam on the hub of the trip-latch, and the compressor-link will be brought into play by the effective action of its cam groove or track, holding the compressor up against the grain and carrying it inward at the proper time to compact the gavel against the binder-arm and give slack in the band, as in machines heretofore built. Finally, the sheaf being bound, the compressor will be thrown down beneath the table by the action of its link, controlled by the cam-groove, and then immediately raised, while the needle will be withdrawn, carrying down the trip-latch by the action of the spring between the needle-shaft crank and the heel of said latch and releasing the backlash-dog, which will be returned to position for engagement by the force of its own independent spring.

I claim—

1. The combination, substantially as hereinbefore set forth, to form a binder-frame, of the post-frame, the transverse bars bolted thereto, the longitudinal tubular bars bolted to the upper sides of said transverse bars, and the sleeves formed integral with said transverse bars at their inner ends beneath the longitudinal bar to take over the guide-bar upon the harvester.

2. The combination, substantially as hereinbefore set forth, of the post-frame, the grain-chute, the guide for the upper end thereof at the head of the harvester-elevator, the transverse frame-bars bolted to the foot and subtending arm of the post-frame and having their general trend divergent from the grain chute or decking, and the guide and supporting bar on the harvester for the inner ends of said transverse frame-bars.

3. The combination, substantially as hereinbefore set forth, of the post-frame, its subtending arm, the transverse frame-bars bolted to feet from said subtending arm, the outer longitudinal frame-bar laid in sockets in said transverse bars beneath and alongside the subtending arm of the post-frame and confined therein by the latter, and the inner tubular bar bolted to the top of the transverse bar.

4. The combination, substantially as hereinbefore set forth, of the post-frame, the grain-chute having its lower end secured in proximity to the subtending arm of said post-frame, the guide upon the harvester for the upper end of said chute or decking, the table-trip, the transverse frame-bars bolted to the post-frame and having their general trend divergent from the grain chute or decking, the inner longitudinal frame-bar bolted to the transverse bars, and the standard rising from said longitudinal bar into close proximity with the under surface of the decking to afford a pivotal support for the inner end of the table-trip.

5. The combination, substantially as hereinbefore set forth, of the table-trip, the compressor, its supporting-block, ears projecting inward from the hub of said supporting-block, and the finger from the table-trip, depending between said ears, whereby the table-trip is guarded against lateral movement.

6. The combination, substantially as hereinbefore set forth, of the driving-dog, the trip-latch, the gear and cam wheel, the needle-shaft and its crank, the compressor-shaft and its crank, and a projection upon said crank, arranged above the heel-extension of the trip-latch, whereby the recession of the compressor depresses the heel of the trip-latch and disengages its nose from the driving-dog.

7. The combination, substantially as hereinbefore set forth, of the driving-dog, the trip-latch having the heel-extension and lateral flange, the needle-shaft crank arranged beneath said flange, the spring arranged between said crank and the heel of the latch, the compressor-shaft crank having a projecting ear arranged above the heel of the trip-latch, whereby the recession of the compressor cramps the spring and disengages the trip-latch.

8. The combination, substantially as hereinbefore set forth, of the compressor, the compressor-shaft crank, the spring-link, the lever from which it is hung, the gear and cam wheel having cam-groove into which a wheel from said lever takes, and an enlargement in said groove corresponding to the point where said wheel rests while the binder is out of action, the driving-dog, the trip-latch having its heel-extension passed beneath a lug on the compressor-shaft crank, the needle-shaft crank, and the spring arranged between said crank and the heel of the compressor, whereby said spring alone is initially affected by the yielding of the compressor before the incoming grain.

9. The combination, substantially as hereinbefore set forth, of the trip-pinion, the stop-lug from its hub, the backlash-dog engaging with said lug, the spring arranged to depress the heel of said dog, the trip-latch, and the cam upon the hub of said trip-latch, arranged to lift said heel and disengage the backlash-dog when the trip-latch rises.

10. The combination, substantially as hereinbefore set forth, to form a tension device, of the plate P, having eye-lugs $p$ saddling one of the frame-bars, and a foot $p'$ resting upon said frame-bar, with the pin $p^2$, its encircling spring, and the adjusting-nut, as described.

HENRY E. PRIDMORE.

Witnesses:
HENRY B. UTLEY,
W. R. BAKER.